(12) United States Patent
Mori et al.

(10) Patent No.: US 11,050,334 B2
(45) Date of Patent: Jun. 29, 2021

(54) ACTUATOR

(71) Applicant: NIDEC SANKYO CORPORATION, Nagano (JP)

(72) Inventors: Akira Mori, Nagano (JP); Hiroshi Kitahara, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 274 days.

(21) Appl. No.: 16/364,668

(22) Filed: Mar. 26, 2019

(65) Prior Publication Data

US 2019/0305658 A1 Oct. 3, 2019

(30) Foreign Application Priority Data

Mar. 30, 2018 (JP) .............................. JP2018-068099

(51) Int. Cl.
*H02K 33/16* (2006.01)
*H02K 33/12* (2006.01)
(Continued)

(52) U.S. Cl.
CPC ............. *H02K 33/16* (2013.01); *H02K 33/00* (2013.01); *H02K 33/02* (2013.01); *H02K 33/12* (2013.01); *H02K 33/18* (2013.01)

(58) Field of Classification Search
CPC ........ H02K 33/16; H02K 33/18; H02K 33/00; H02K 33/02; H02K 33/12; H02K 33/04; H02K 33/06; H02K 33/08; H02K 33/10; H02K 33/14; H02K 5/04; H02K 41/00; H02K 41/02; H02K 41/025; H02K 41/03; H02K 41/031; H02K 41/033; H02K 41/035; H02K 41/0352; H02K 41/0354; H02K 41/0356; H02K 41/0358; H02K 41/06; H02K 41/065; H02K 15/00;
(Continued)

(56) References Cited

U.S. PATENT DOCUMENTS

2012/0187780 A1* 7/2012 Bang ..................... H02K 33/16
310/25
2017/0033673 A1* 2/2017 Wang ..................... H02K 33/16
(Continued)

FOREIGN PATENT DOCUMENTS

JP        2016127789 A    7/2016
WO    WO-2018030265 A1 * 2/2018 ............. H02K 33/04

*Primary Examiner* — Quyen P Leung
*Assistant Examiner* — Alexander A Singh
(74) *Attorney, Agent, or Firm* — Cantor Colburn LLP

(57) ABSTRACT

An actuator may include a movable body; a support body; a connecting body disposed in contact with both the movable body and the support body; and a magnetic driving circuit including a coil provided in a first member, and a permanent magnet provided in a second member. The magnetic driving circuit may vibrate the movable body. The first member may include a coil holder and a power supply board. Both end portions of the power supply board may fit, from a second side in the first direction, inside of a pair of slits extending to a first side in the first direction. The power supply board may fit in the pair of slits to a depth in which the power supply board is in contact with a contact portion of the coil holder. The coil wire may be slackened in a section between the coil and a connecting position.

17 Claims, 11 Drawing Sheets

(51) Int. Cl.
*H02K 33/18* (2006.01)
*H02K 33/00* (2006.01)
*H02K 33/02* (2006.01)

(58) Field of Classification Search
CPC ........... H02K 15/0056; H02K 15/0062; H02K 15/0068; B06B 1/045; B06B 1/04
USPC ......... 310/12.01, 12.02, 12.04, 12.05, 12.06, 310/12.07, 12.08, 12.09, 12.11, 12.12, 310/12.13, 12.14, 12.15, 12.16, 12.17, 310/12.18, 12.19, 12.21, 12.22, 12.23, 310/12.24, 12.25, 12.26, 12.27, 12.28, 310/12.29, 12.31, 12.32, 12.33
See application file for complete search history.

(56) References Cited

U.S. PATENT DOCUMENTS

2017/0133918 A1* 5/2017 Xu .................... H02K 33/16
2019/0190365 A1* 6/2019 Takeda ............... H02K 33/16

\* cited by examiner

ACTUATOR

CROSS REFERENCE TO RELATED APPLICATION

The present application claims priority under 35 U.S.C. § 119 to Japanese Application No. 2018-068099 filed Mar. 30, 2018, the entire content of which is incorporated herein by reference.

BACKGROUND

At least an embodiment of the present invention relates to an actuator that linearly drives a movable body to vibrate, and a method for manufacturing an actuator.

As a device that provides information by vibration, an actuator including a movable body having a permanent magnet and a support body having a coil disposed to face the permanent magnet is proposed. The support body includes a coil holder that holds a coil, a case that covers the movable body and the coil holder, and a power supply body to which a coil wire forming the coil is connected (see Japanese Unexamined Patent Application Publication No. 2016-127789). In the actuator described in Japanese Unexamined Patent Application Publication No. 2016-127789, the power supply board is fixed to the case so as to protrude from the case.

The actuator described in Japanese Unexamined Patent Application Publication No. 2016-127789 is required to be usable in a wide temperature range. However, when the temperature changes, stress is applied to the coil wire due to a difference in a thermal expansion coefficient between the coil wire and peripheral parts, and there is a possibility that the coil wire is cut. Therefore, it is desirable to provide the coil wire with appropriate slackness, but providing appropriate slackness is quite difficult.

In view of the above problem, at least an embodiment of the present invention provides an actuator capable of easily providing appropriate slackness to a coil wire between a coil and a power supply board, and a method for manufacturing an actuator.

SUMMARY

An actuator according to at least an embodiment of the present invention includes: a movable body; aa support body; aa connecting body having at least one of elasticity and viscoelasticity, and is disposed to be in contact with both the movable body and the support body in a position in which the movable body and the support body face each other; and a magnetic driving circuit including a coil provided in a first member that is one of the movable body and the support body, and a permanent magnet provided in a second member that is one of the movable body and the support body so as to face the coil in a first direction, the magnetic driving circuit causing the movable body to vibrate with respect to the support body in a second direction which intersects with the first direction, wherein the first member includes a coil holder that holds the coil, a power supply board to which a coil wire forming the coil extending from a first side to a second side in the first direction is connected, and both end portions of the power supply board being fit, from a second side in the first direction, inside of a pair of slits extending to a first side in the first direction in positions in which the slits face each other of the coil holder. The power supply board is fit in the pair of slits to a depth in which the power supply board is in contact with a contact portion provided in the coil holder from the second side in the first direction, and the coil wire is slackened between the coil and a connecting position with the power supply board.

In at least an embodiment of the present invention, the coil wire forming the coil extends from the first side to the second side in the first direction and is connected to the power supply board, and both end portions of the power supply board are fit, from the second side in the first direction, inside of the pair of slits extending to the first side in the first direction in positions in which the slits face each other of the coil holder. Here, the power supply board is fit in the pair of slits to a depth in which the power supply board is in contact with a contact portion provided in the coil holder from the second side in the first direction, and is positioned on the furthermost part of the first side in the first direction. Therefore, it is possible to easily provide appropriate slackness to the coil wires extending from the first side to the second side in the first direction.

In at least an embodiment of the present invention, in a method for manufacturing an actuator that includes a movable body; aa support body; and a connecting body disposed so as to be in contact with both the movable body and the support body in a position in which the movable body and the support body face each other; and a magnetic driving circuit including a coil provided in a first member that is one of the movable body and the support body, and a permanent magnet provided in a second member that is one of the movable body and the support body so as to face the coil in a first direction, the magnetic driving circuit causing the movable body to vibrate with respect to the support body in a second direction which intersects with the first direction, the method comprising: providing a pair of slits extending to a first side in the first direction in positions in which the slits face each other of the coil holder that holds the coil in the first member; when both the end portions of the power supply board are fit inside the pair of slits from a second side in the first direction, in a middle position until the power supply board comes into contact with a contact portion provided in the coil holder from the second side in the first direction, drawing the coil wire forming the coil from the first side to the second side in the first direction and connecting the coil wire to the power supply board; and then, pushing the power supply board into the pair of slits to a depth in which the power supply board comes into contact with the contact portion from the second side in the first direction.

In at least an embodiment of the present invention, a configuration may be employed in which the coil wire is made to tense in a depth position in which the power supply board is separated from the contact portion to the second side in the first direction while being fit in the pair of slits.

In at least an embodiment of the present invention, a configuration may be employed in which the power supply board is a rigid board.

In at least an embodiment of the present invention, a configuration may be employed in which the width of the pair of slits is narrower from the middle in the depth direction. With this configuration, when the power supply board is inserted to the position in which the widths of the slits are decreased, the power supply board is temporarily fixed to the slits. Therefore, when the power supply board is pushed deeper into the slits after connecting the coil wires to the temporarily fixed power supply board, the coil wires can be slackened.

In at least an embodiment of the present invention, a configuration may be employed in which the first member is the support body and the second member is the movable body. That is, a configuration may be employed in which the coil is provided in the support body and the magnet is provided in the movable body.

In at least an embodiment of the present invention, the coil wire forming the coil extends from the first side to the second side in the first direction and is connected to the power supply board, and both end portions of the power supply board are fit, from the second side in the first direction, inside of the pair of slits extending to the first side in the first direction in positions in which the slits face each other of the coil holder. Here, the power supply board is fit in the pair of slits to a depth in which the power supply board is in contact with a contact portion provided in the coil holder from the second side in the first direction, and is positioned on the furthermost part of the first side in the first direction. Therefore, it is possible to easily provide appropriate slackness to the coil wires extending from the first side to the second side in the first direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Below, embodiments of the present invention will be described with reference to the drawings. In the following description, a direction in which a movable body 6 is moved linearly (second direction, vibration direction) is denoted by X, a first direction which intersects with the second direction X is denoted by Z, and a third direction which intersects with the first direction Z and the second direction X is denoted by Y. Further, a first side in the second direction X is denoted by X1, a second side in the second direction X is denoted by X2, a first side in the first direction Z is denoted by Z1, a second side in the first direction Z is denoted by Z2, a first side in the third direction Y is denoted by Y1, and a second side in the third direction Y is denoted by Y2. Below, a case in which a first member holding the coil is a support body 2 and a second member holding a permanent magnet is the movable body 6 is mainly described.

(Entire Configuration)

Figure 1:
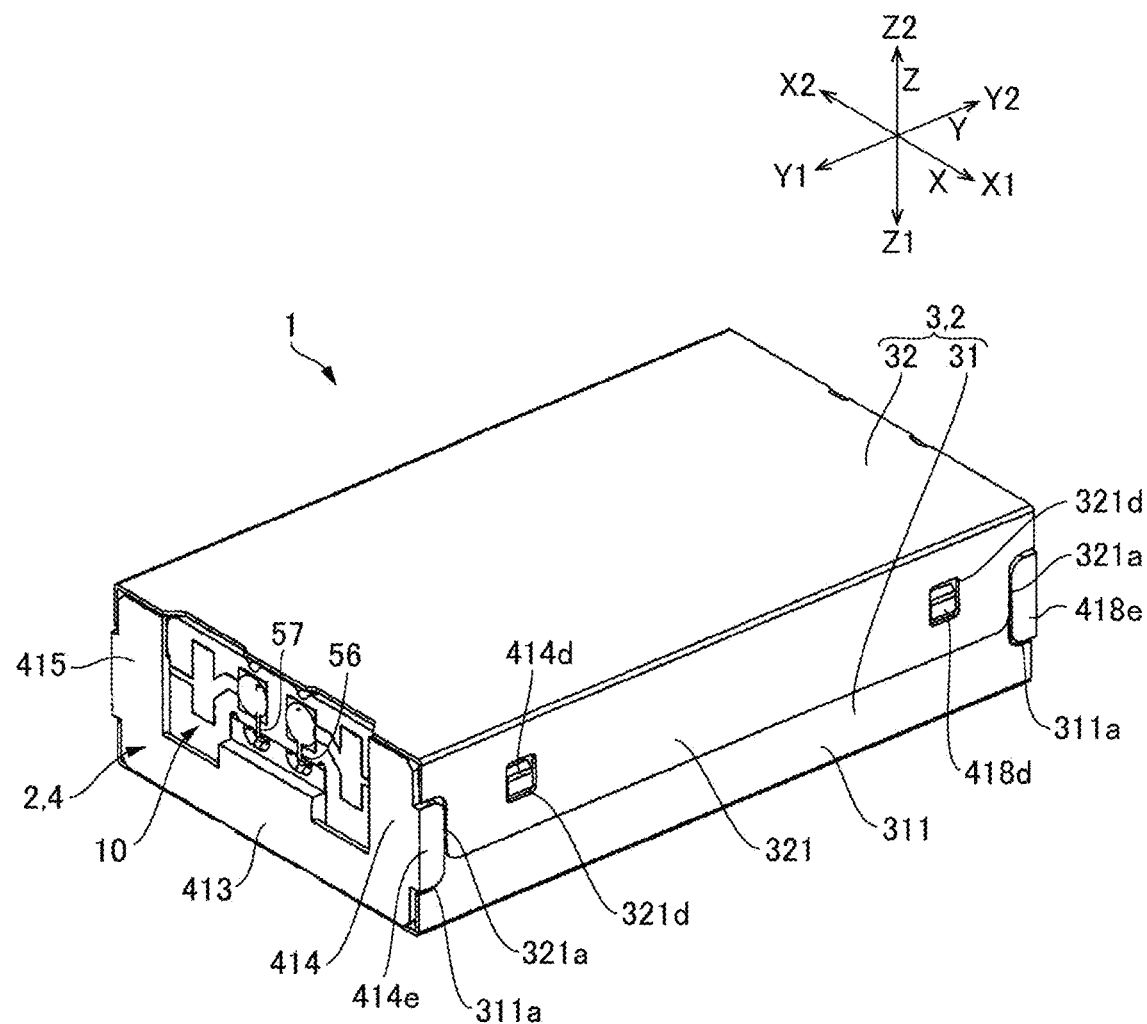
FIG. 1 is a perspective view of an actuator to which at least an embodiment of the present invention is applied.
Figure 2:
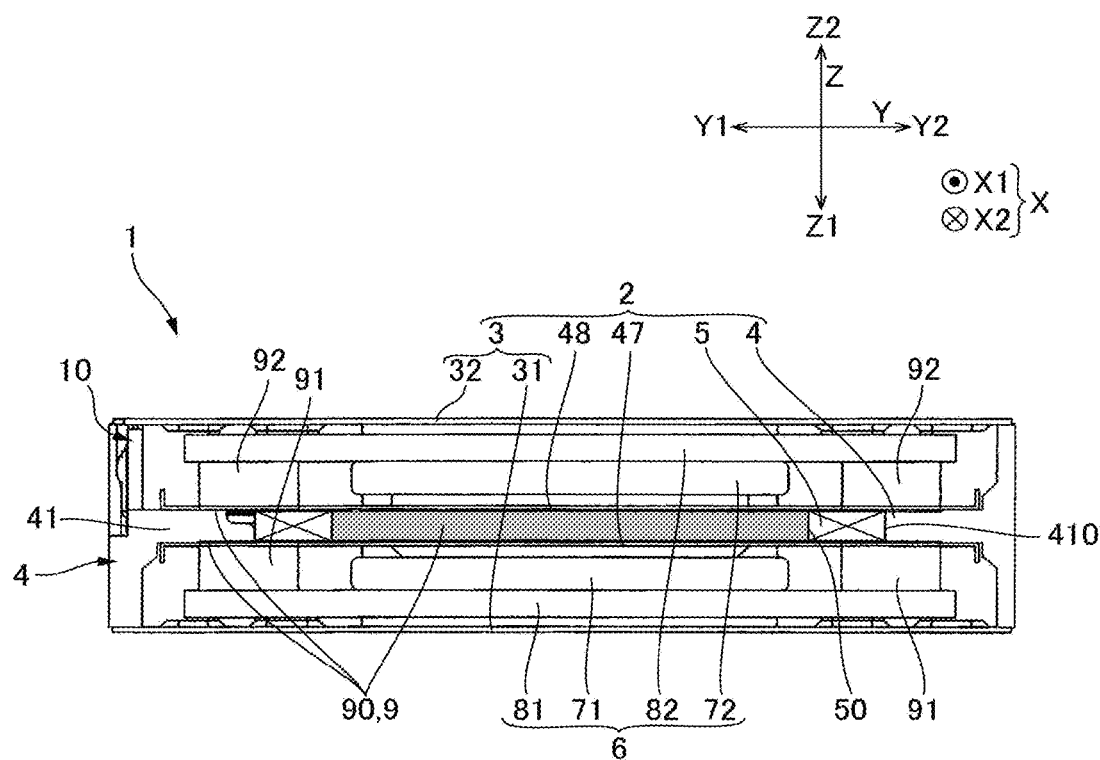
FIG. 2 is a cross-sectional view along Y and Z directions of the actuator illustrated in FIG. 1.
Figure 3:
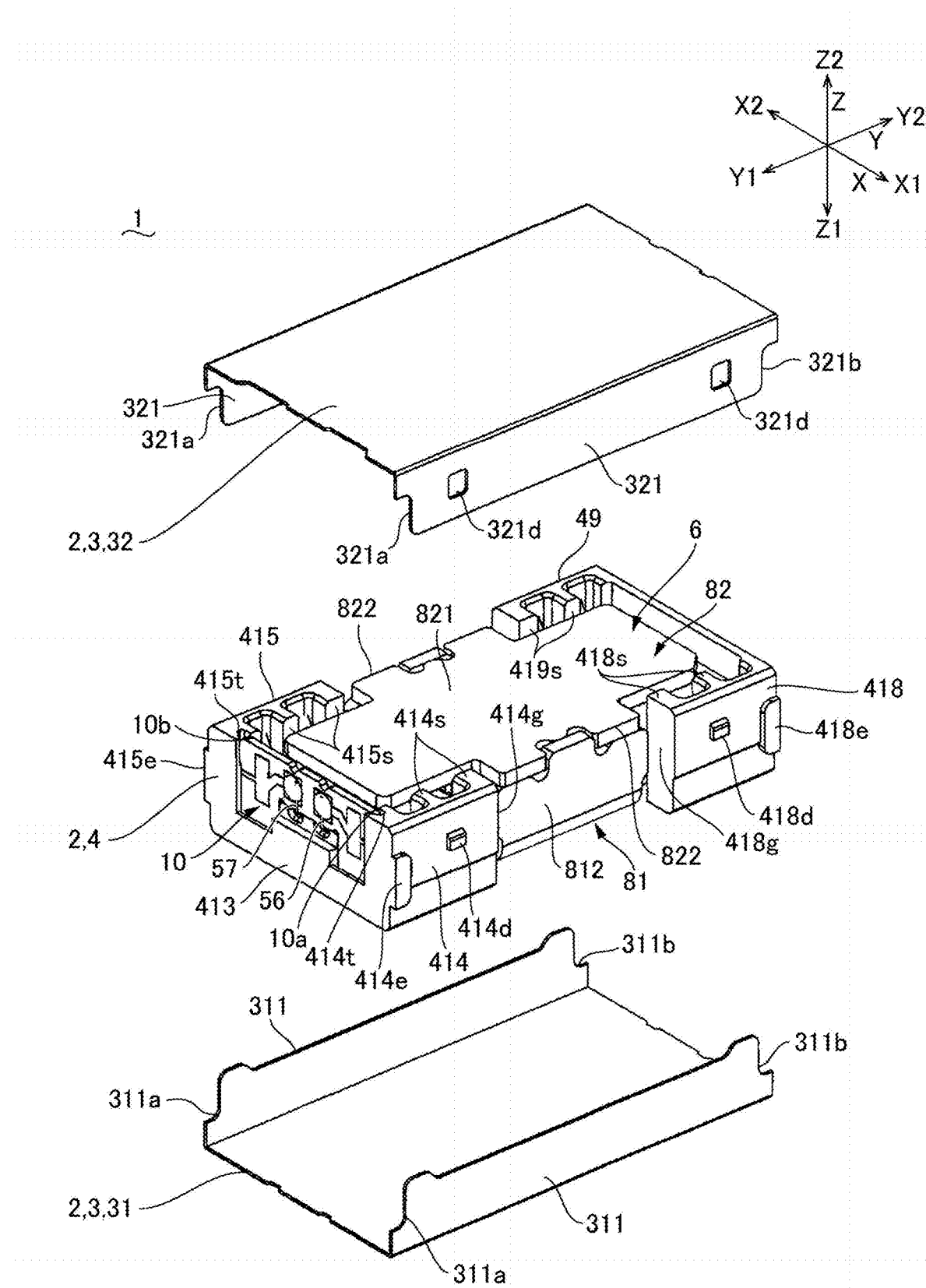
FIG. 3 is an exploded perspective view of the actuator illustrated in FIG. 1.
Figure 4:
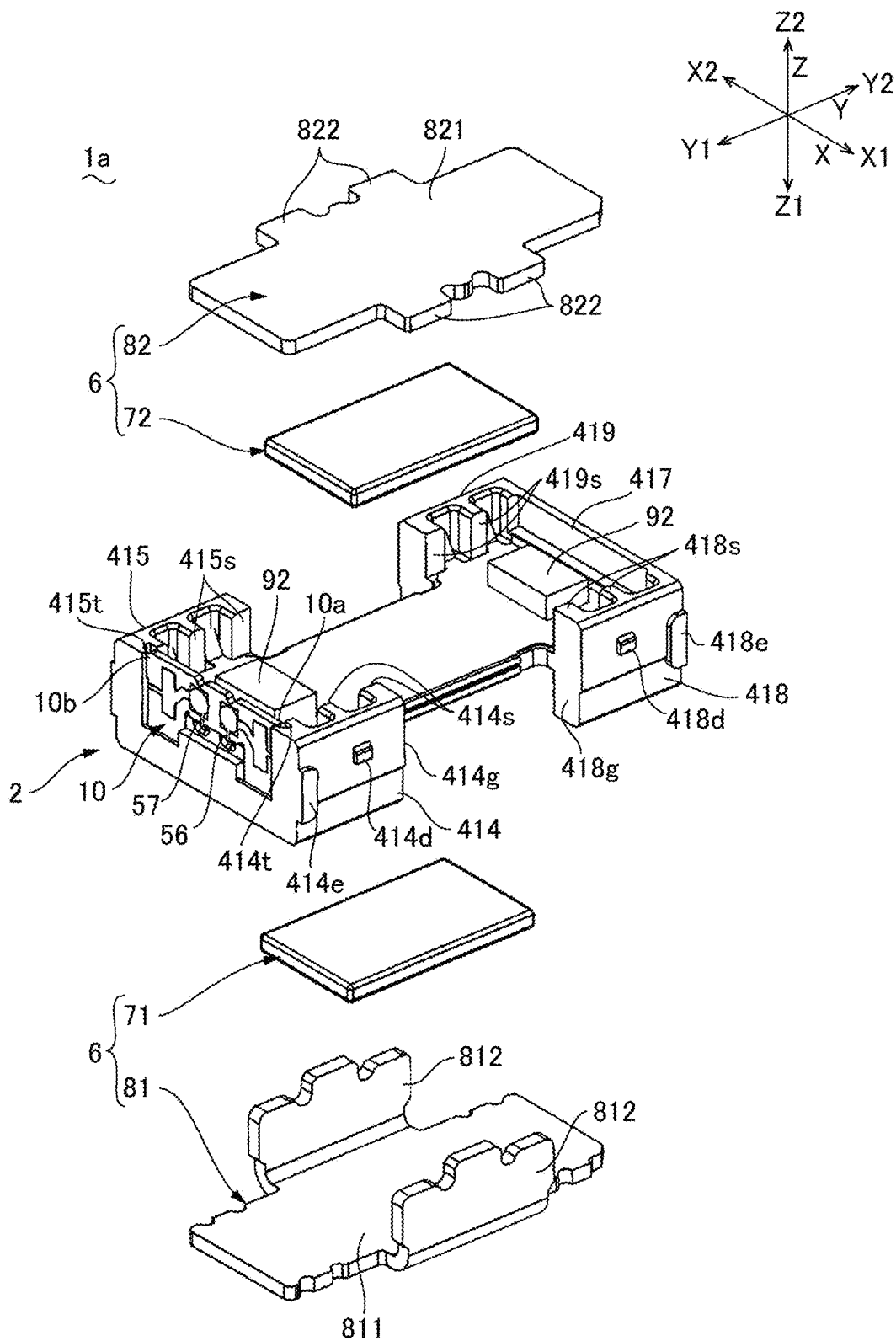
FIG. 4 is an exploded perspective view of the actuator illustrated in FIG. 1 disassembled into a support body and a movable body.
Figure 5:
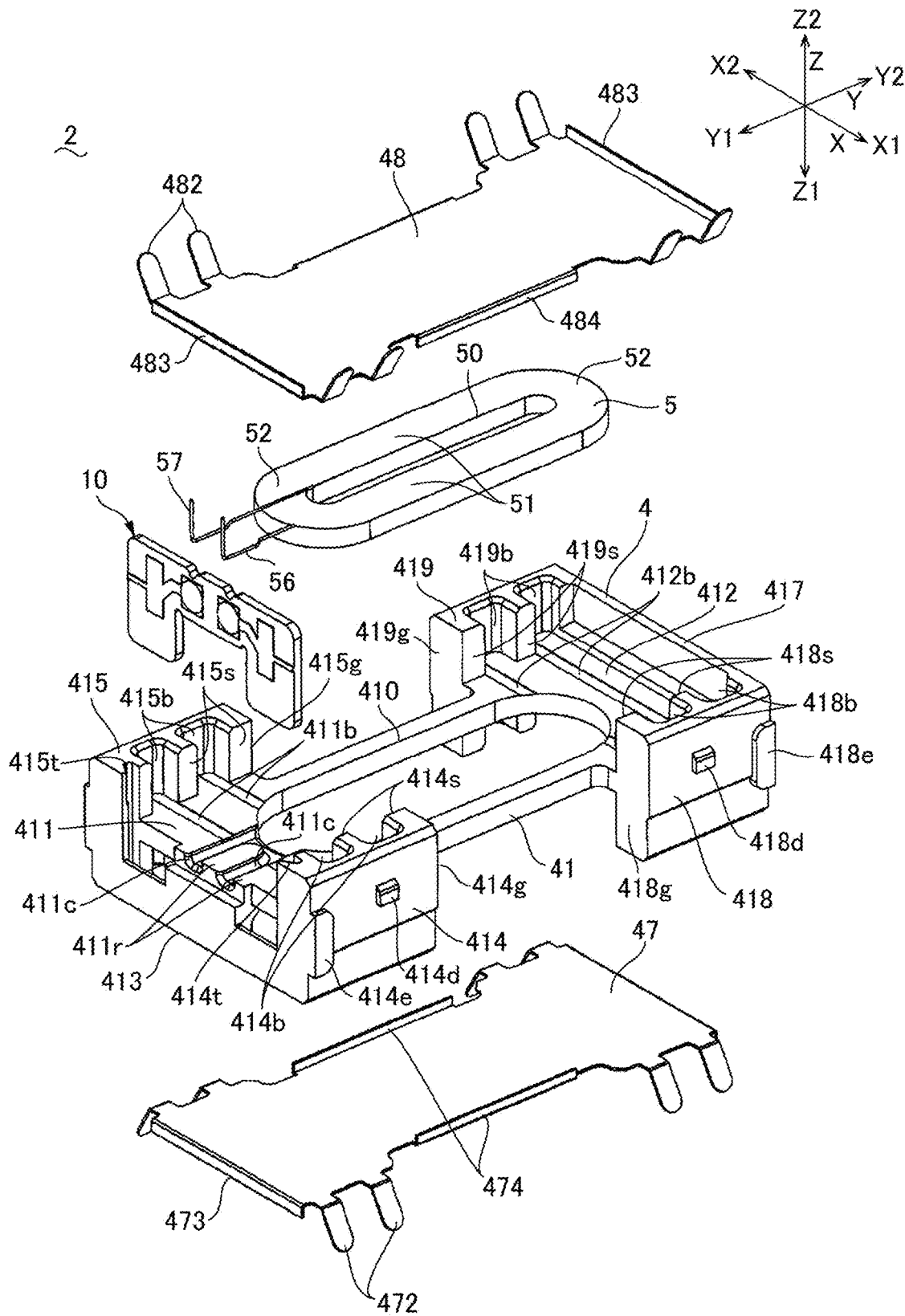
FIG. 5 is an exploded perspective view of the support body illustrated in FIG. 4 when viewed from a second side in a first direction.
Figure 6:
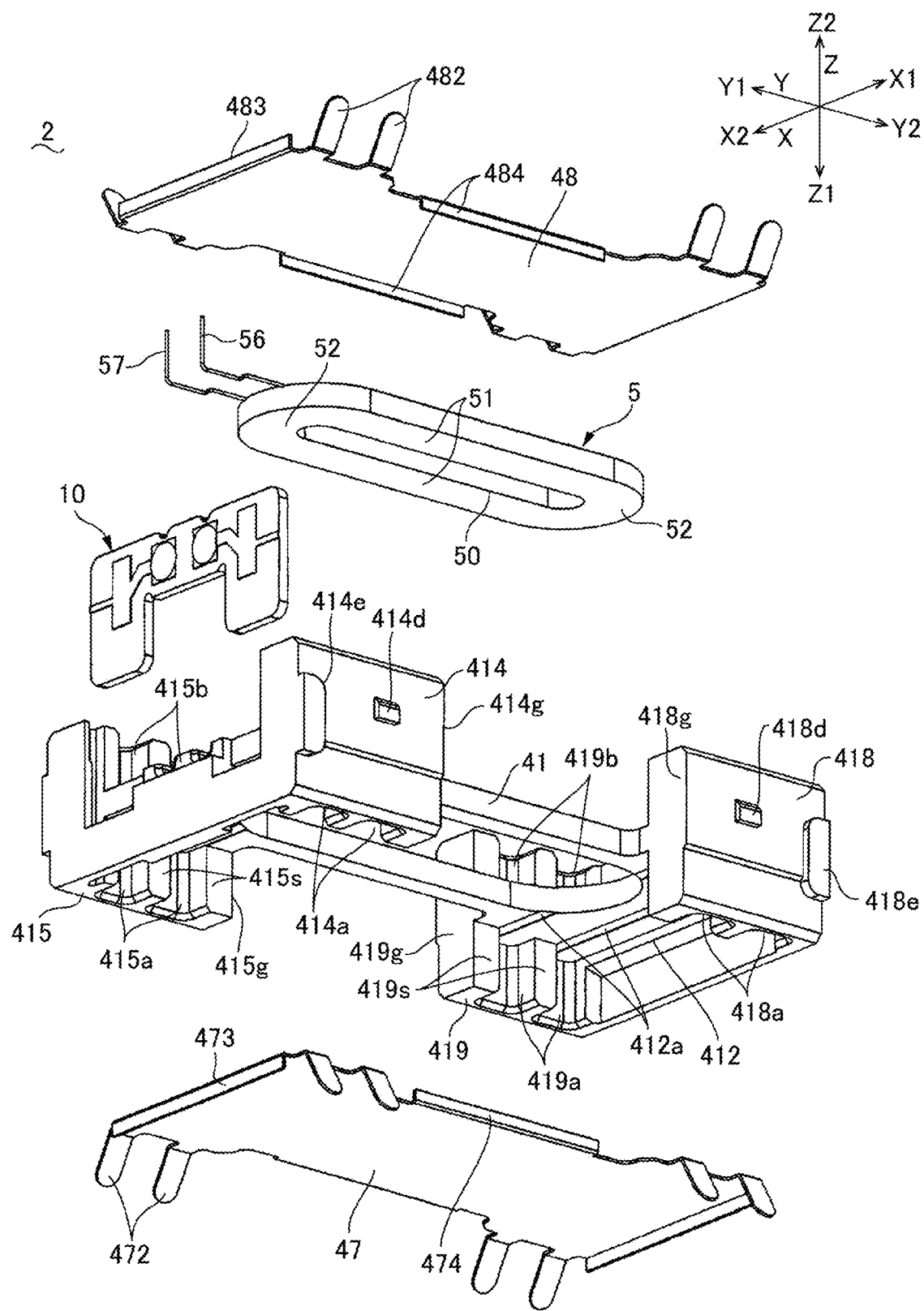
FIG. 6 is an exploded perspective view of the support body illustrated in FIG. 4 when viewed from a first side in the first direction.

FIG. 1 is a perspective view of an actuator 1 to which at least an embodiment of the present invention is applied. FIG. 2 is a cross-sectional view along Y and Z directions of the actuator 1 illustrated in FIG. 1. FIG. 3 is an exploded perspective view of the actuator 1 illustrated in FIG. 1. FIG. 4 is an exploded perspective view of the actuator 1 illustrated in FIG. 1 disassembled into the support body 2 and the movable body 6. FIG. 5 is an exploded perspective view of the support body 2 illustrated in FIG. 4 when viewed from the second side Z2 in the first direction Z. FIG. 6 is an exploded perspective view of the support body 2 illustrated in FIG. 4 when viewed from the first side Z1 in the first direction Z.

The actuator 1 illustrated in FIG. 1 has a rectangular parallelepiped shape with its longitudinal direction oriented in the third direction Y. The actuator 1 provides the user who holds the actuator 1 in the hand with information by vibration in the second direction X. Accordingly, the actuator 1 can be used as an operation member, etc. of a game machine, of which vibration and the like provides a user with new feeling.

As illustrated in FIG. 2, FIG. 3, and FIG. 4, the actuator 1 includes the support body 2 including a rectangular case 3 that defines an outer shape of the actuator 1, and the movable body 6 supported to be movable inside the case 3 in the second direction X with respect to the support body 2. The actuator 1 outputs information when the movable body 6 vibrates in the second direction X.

In the present embodiment, as will be described below with reference to FIG. 2 to FIG. 6, the support body 2 includes the case 3, the coil holder 4, the coil 5, and a power supply board 10, and the movable body 6 includes permanent magnets (first permanent magnet 71 and second permanent magnet 72), and yokes (first yoke 81 and second yoke 82). The coil 5 and the permanent magnets (the first permanent magnet 71 and the second permanent magnet 72) form a magnetic driving circuit 1a. The movable body 6 is supported by the support body 2 via connecting bodies 91 and 92 provided between the movable body 6 and the support body 2. The connecting bodies 91 and 92 have at least one of elasticity and viscoelasticity.

(Configuration of Movable Body 6)

As illustrated in FIG. 2, FIG. 3, and FIG. 4, the movable body 6 includes the first yoke 81 disposed on the first side Z1 in the first direction Z with respect to the coil 5 and is made of a magnetic plate, and the flat-plate shaped first permanent magnet 71 held on a surface of the first yoke 81 on the second side Z2 in the first direction Z so as to face the coil on the first side Z1 in the first direction Z. Further, the movable body 6 includes the second yoke 82 disposed on the second side Z2 in the first direction Z with respect to the coil 5 and is made of a magnetic plate, and the flat-plate shaped second permanent magnet 72 held on a surface of the second yoke 82 on the first side Z1 in the first direction Z so as to face the coil on the second side Z2 in the first direction Z. In the present embodiment, the movable body 6 is formed by the first yoke 81, the first permanent magnet 71, the second yoke 82, and the second permanent magnet 72.

The first yoke 81 includes a flat plate part 811 to which the first permanent magnet 71 is fixed, and a pair of connecting portions 812 bent to the second side Z2 in the first direction Z from end portions on both sides of the flat plate part 811 in the second direction X. The second yoke 82 includes a flat plate part 821 to which the second permanent magnet 72 is fixed, and a pair of projecting portions 822 projecting to the first side X1 and the second side X2 in the second direction X is formed in a center part of the flat plate part 821 in the third direction Y. In the present embodiment, a pair of connecting portions 812 of the first yoke 81 is coupled to the pair of projecting portions 822 by welding or the like.

Each of the first permanent magnet 71 and the second permanent magnet 72 is magnetized to have different polarities on the first side X1 and the second side X2 in the first direction.

(Configuration of Support Body 2)

As illustrated in FIG. 1, FIG. 2 and FIG. 3, in the support body 2, the case 3 includes a first case member 31 positioned on the first side Z1 in the first direction Z and a second case member 32 positioned on the second side Z2 in the first direction Z to overlap the first case member 31. The case 3 is formed by a pair of side plate parts 311 provided on both sides in the second direction X of the first case member 31, and a pair of side plate parts 321 provided on both sides in the second direction X of the second case members 32. The pair of side plate parts 321 is disposed over the pair of side plate parts 311. Between the first case member 31 and the second case member 32, the coil holder 4, the coil 5 and the movable body 6 illustrated in FIG. 4 and FIG. 5 are accommodated. In the present embodiment, both ends of the case 3 in the third direction Y are open.

In the pair of side plate parts 311 of the first case member 31 and the pair of side plate parts 321 of the second case member 32, cutouts 311a, 321a, 311b, and 321b are formed at both end portions in the third direction Y. Engagement holes 321d are formed in positions separated in the third direction Y in the side plate part 321.

As illustrated in FIG. 5, the coil 5 is an air-core coil having an annular planar shape wound in an oval shape, and is held by the coil holder 4. The coil 5 includes two long side portions 51 extending in the third direction Y in parallel in the second direction X, and two arc-shaped short side portions 52 connecting both ends of the two long side portions 51 in the third direction Y. The first permanent magnet 71 faces the long side portions 51 of the thus-configured coil 5 on the first side Z1 in the first direction Z, and the second permanent magnet 72 faces the long side portions 51 on the second side Z2 in the first direction Z.

As illustrated in FIG. 4 and FIG. 5, the coil holder 4 is provided with a plate part 41 in which a coil placement hole 410 is formed through in the first direction Z. The coil placement hole 410 is an oval through-hole in which the coil 5 is placed.

At an end portion 411 of the plate part 41 on the first side Y1 in the third direction Y, a plurality of recessed parts 411b extending in the second direction X is formed on a surface on the second side Z2 in the first direction Z, and a plurality of recessed parts (not illustrated) similar to the recessed part 411b is also formed on the surface on the first side Z1 in first direction Z.

At the end portion 411, a side plate part 413 protrudes to the first side Z1 in the first direction Z from an edge on the first side Y1 in the third direction Y, and side plate parts 414 and 415 protrude to the first side Z1 and the second side Z2 in the first direction Z from an edge on the first side X1 in the second direction X and an edge on the second side X2 in the second direction X, respectively. On inner surfaces 414s and 415s of the side plate parts 414 and 415, first holding portions 414a and 415a, which are groove-shaped recessed parts extending in the first direction Z, are formed on the first side Z1 in the first direction Z with respect to the plate part 41. Further, on the inner surfaces 414s and 415s of the side plate parts 414 and 415, second holding portions 414b and 415b, which are groove-shaped recessed parts extending in the first direction Z, are formed on the second side Z2 in the first direction Z with respect to the plate part 41.

At the end portion 412 of the plate part 41 on the second side Y2 in the third direction Y, a plurality of recessed parts 412b extending in the second direction X is formed on a surface on the second side Z2 in the first direction Z, and a plurality of recessed parts 412a similar to the recessed parts 412b is also formed on a surface on the first side Z1 in the first direction Z.

At the end portion 412, side plate parts 417, 418, and 419 protrude to the first side Z1 and the second side Z2 in the first direction Z from an edge on the second side Y2 in the third direction Y, an edge on the first side X1 in the second direction X, and an edge on the second side X2 in the second direction X. On inner surfaces 418s and 419s of the side plate parts 418 and 419, first holding portions 418a and 419a, which are groove-shaped recessed parts extending in the first direction Z, are formed on the first side Z1 in the first direction Z with respect to the plate part 41. Further, on the inner surfaces 418s and 419s of the side plate parts 418 and 419, second holding portions 418b and 419b, which are groove-shaped recessed parts extending in the first direction Z, are formed on the second side Z2 in the first direction Z with respect to the plate part 41.

A protruding portion 414e with which the cutouts 311a formed in the pair of side plate parts 311 of the first case member 31 and the cutouts 321a formed in the pair of side plate parts 321 of the second case member 32 come into contact is formed at an end portion on the first side Y1 in the third direction Y on an outer surface of the side plate part 414. A protruding portion 415e similar to the protruding portion 414e is formed also on an outer surface of the side plate part 415. A protruding portion 418e with which the cutouts 311b formed in the pair of side plate parts 311 of the first case member 31 and the cutouts 321b formed in the pair of side plate parts 321 of the second case member 32 come into contact is formed at an end portion on the second side Y2 in the third direction Y on an outer surface of the side plate part 418. A protruding portion (not illustrated) similar to the protruding portion 418e is formed also on an outer surface of the side plate part 419.

Engagement protruding portions 414d and 418d for engaging the engagement holes 321d formed in each of the pair of side plate parts 321 of the second case member 32 are formed on the outer surface of the side plate part 414 and the outer surface of the side plate part 418. Engagement protruding portions (not illustrated) similar to the engagement protruding portions 414d and 418d are formed on the outer surface of the side plate part 415 and the outer surface of the side plate part 419.

(Configuration of First Plate 47 and Second Plate 48)

The thus-configured support body 2 includes a first plate 47 that overlaps the coil placement hole 410 and the plate part 41 from the first side Z1 in the first direction Z. The coil 5 is fixed to the first plate 47 and the plate part 41 by an adhesive layer 9 made at least of an adhesive poured into the air-core portion 50 of the coil 5. Therefore, the coil 5 faces the first permanent magnet 71 in the first direction Z via the first plate 47. The first plate 47 is fixed to the plate part 41 by the adhesive layer 9. At this time, the recessed part 412a and the like formed in the plate part 41 are reservoirs of the adhesive layer 9.

Further, the support body 2 includes a second plate 48 that overlaps the coil placement hole 410 and the plate part 41 from the second side Z2 in the first direction Z. The coil 5 is fixed to the second plate 48 by the adhesive layer 9 made at least of an adhesive with which the air-core portion 50 of the coil 5 is filled. Therefore, the coil 5 faces the second permanent magnet 72 in the first direction Z via the second plate 48. The second plate 48 is fixed to the plate part 41 by the adhesive layer 9. At that time, the recessed parts 411b and 412b, etc. formed in the plate part 41 are reservoirs of the adhesive layer 9.

In the present embodiment, the first plate 47 is made of a non-magnetic material and the second plate 48 is made of a non-magnetic material. In the present embodiment, the first plate 47 is made of a metal plate and the second plate 48 is made of a metal plate. More specifically, the first plate 47 is made of a non-magnetic stainless-steel plate and the second plate 48 is made of a non-magnetic stainless-steel plate.

The first plate 47 includes claw-shaped protruding portions 472 that protrude obliquely from the first side Z1 in the first direction Z from both sides in the second direction X. The protruding portions 472 come into elastic contact with the inside of the first holding portions 414a, 415a, 418a, and 419a formed as groove-shaped recessed parts in the side plate parts 414, 415, 418, and 419. The protruding portions 472 are held by the coil holder 4. The second plate 48 includes claw-shaped protruding portions 482 that protrude obliquely from the second side Z2 in the first direction Z from both sides in the second direction X. The protruding portions 482 come into elastic contact with the inside of the second holding portions 414b, 415b, 418b, and 419b formed as groove-shaped recessed parts in the side plate parts 414, 415, 418, and 419. The protruding portions 482 are held by the coil holder 4. The first plate 47 includes bent portions 473 bent to the first side Z1 in the first direction Z at both ends in the third direction Y, and bent portions 474 bent to the second side Z2 in the first direction Z at both ends in the second direction X. The second plate 48 includes bent portions 483 bent to the second side Z2 in the first direction Z at both ends in the third direction Y, and bent portions 484 bent to the first side Z1 in the first direction Z at both ends in the second direction X. With this configuration, strength of the first plate 47 and the second plate 48 against bending is increased by the bent portions 473, 474, 483, and 484.

As described above, in the actuator 1 of the present embodiment, the coil 5 is disposed inside the coil placement hole 410 formed through the plate part 41 of the coil holder 4 in the first direction Z, and the first plate 47 is disposed so as to overlap the coil placement hole 410 and the plate part 41 from the first side Z1 in the first direction Z. Therefore, when the air-core portion 50 of the coil 5 is filled with an adhesive, the adhesive flows between the coil 5 and the coil holder 4, between the coil 5 and the first plate 47, and between the first plate 47 and the coil holder 4. When the adhesive is cured, the coil 5, the first plate 47, and the coil holder 4 are fixed by the adhesive layer 9. Therefore, unlike when the adhesive is poured into a gap between an outer circumferential surface of the coil 5 and an inner circumferential surface of the coil placement hole 410, the coil 5 placed in the coil placement hole 410 of the coil holder 4 can be properly made to adhere to the coil holder 4. The first plate 47 is interposed between the first permanent magnet 71 and the coil 5. Therefore, even when the movable body 6 is moved to the first side Z1 in the first direction Z, the first permanent magnet 71 and the coil 5 do not come into direct contact with each other, so the coil 5 is not easily damaged.

Further, when the air-core portion 50 of the coil 5 is filled with the adhesive and then the second plate 48 is placed thereon, the adhesive smoothly flows between the coil 5 and the coil holder 4, between the coil 5 and the first plate 47, and between the first plate 47 and the coil holder 4, and, at the same time, flows between the coil 5 and the second plate 48, and between the second plate 48 and the coil holder 4. Therefore, when the adhesive is cured, the coil 5, the first plate 47, the second plate 48, and the coil holder 4 are fixed by the adhesive layer 9. In this state, the second plate 48 is interposed between the second permanent magnet 72 and the coil 5. Therefore, even when the movable body 6 is moved to the second side Z2 in the first direction Z, the second permanent magnet 72 and the coil 5 do not come into direct contact with each other, so the coil 5 is not easily damaged.

Since the first plate 47 is made of a non-magnetic material and the second plate 48 is made of a non-magnetic material, the magnetic flux from the first permanent magnet 71 and the magnetic flux from the second permanent magnet 72 interlink with the coil 5 without being affected by the first plate 47 and the second plate 48. Further, since the first plate 47 is made of a metal plate and the second plate 48 is made of a metal plate, heat generated by the coil 5 can be radiated efficiently through the first plate 47 and the second plate 48. Further, since the first plate 47 is made of a stainless-steel plate and the second plate 48 is made of a stainless-steel plate, the first plate 47 and the second plate 48 have sufficient strength, even though these plates are thin.

Further, the coil holder 4 includes the first holding portions 414a, 415a, 418a, and 419a that engage the claw-shaped first protruding portions 472 of the first plate 47 and hold the first plate 47, and the second holding portions 414b, 415b, 418b, and 419b that engage the claw-shaped second protruding portions 482 of the second plate 48 and hold the second plate 48. Therefore, it is not necessary to support the first plate 47 and the second plate 48 with a jig until the adhesive is cured.

(Configuration of Connecting Bodies 91 and 92)

As illustrated in FIG. 2, FIG. 3, FIG. 4, and FIG. 5, the movable body 6 is supported to be movable in the second direction X and the third direction Y by the connecting bodies 91 and 92 provided between the movable body 6 and the support body 2.

In the present embodiment, the connecting bodies 91 are provided in portions in which the first yoke 81 and the first plate 47 face each other in the first direction Z. The connecting bodies 92 are provided in portions in which the second yoke 82 and the second plate 48 face each other in the first direction Z. More specifically, the connecting bodies 91 are provided in two portions separated in the third direction Y (on the side of the short side portions 52 of the coil 5) in each of which the first yoke 81 and the first plate 47 face each other in the first direction Z. The connecting bodies 92 are provided in two portions separated in the third direction Y (on the side of the short side portions 52 of the coil 5) in each of which the second yoke 82 and the second plate 48 face each other in the first direction Z. Therefore, the movable body 6 can be supported to be movable in the second direction X without using a plate spring or the like.

In the present embodiment, the connecting bodies 91 and 92 are viscoelastic members. More specifically, the connecting bodies 91 and 92 (viscoelastic members) are gel members made of silicone gel or the like. In the present embodiment, the connecting bodies 91 and 92 are made of silicone gel having penetration of 90° to 110°. As defined in JIS K 2207 and JIS K 2220, the penetration is measured as the penetration depth of a ¼ scale cone needle, which weighs 9.38 g, penetrating per 5 seconds at 25° C., is expressed in ¹⁄₁₀ mm: the smaller the value is, the harder the silicone is. Fixing of the connecting bodies 91 and 92 to the first yoke 81 and to the second yoke 82 and fixing of the connecting bodies 91 and 92 to the coil holder 4 are performed by using an adhesive property of adhesives or a silicone gel.

As described above, in the actuator 1 of the present embodiment, since the connecting bodies 91 and 92 are provided between the movable body 6 and the support body 2, resonance of the movable body 6 can be suppressed. The connecting bodies 91 are provided between the first plate 47 and the first yoke 81, and the connecting bodies 92 are provided between the second plate 48 and the second yoke 82. Thus, the case 3 is not used to provide the connecting bodies 91 and 92. Therefore, the connecting bodies 91 and 92 can be provided between the support body 2 and the movable body 6 without using the case 3. Therefore, since the connecting bodies 91 and 92 can be provided in the middle of assembly in which the case 3 is not yet provided, vibration characteristics including damper characteristics can be measured during manufacturing. Since the case 3 is not used for providing the connecting bodies 91 and 92, the connecting bodies 91 and 92 can be provided in actuators not including the case 3.

The connecting bodies 91 and 92 are provided in positions facing the support body 2 and the movable body 6 in the first direction Z which intersects with the second direction X (vibration direction). Therefore, when the movable body 6 vibrates in the second direction X, the movable body 6 deforms in the shear direction to prevent resonance. Therefore, even when the movable body 6 vibrates in the second direction X, a change in elastic modulus of the connecting bodies 91 and 92 is small, so the resonance of the movable body 6 can be effectively suppressed.

The connecting bodies (connecting bodies 91 and 92) are viscoelastic members (plate-like gel members), and have linear or non-linear stretching characteristics, depending on the stretching direction. For example, when pressed in the thickness direction (axial direction) for compressive deformation, the connecting bodies 91 and 92 demonstrate the stretching characteristics in which the non-linear component is greater than the linear component (spring coefficient). On the contrary, when stretched by being pulled in the thickness direction (axial direction), the connecting bodies 91 and 92 demonstrate the stretching characteristics in which the linear component (spring coefficient) is greater than the non-linear component (spring coefficient). Further, when deformed in the direction (shear direction) which intersects with the thickness direction (axial direction), deformation of the connecting bodies 91 and 92 is caused when stretched by being pulled whichever direction they are moved. Therefore, the connecting bodies 91 and 92 demonstrate the deformation characteristics in which the linear component (spring coefficient) is greater than the non-linear component (spring coefficient). In the present embodiment, when the movable body 6 vibrates in the second direction X, the connecting bodies 91 and 92 are deformed in the shear direction. Therefore, in the connecting bodies 91 and 92, when the movable body 6 vibrates in the second direction X, the spring force in the movement direction becomes constant. Thus, by using spring elements in the shear direction of the connecting bodies 91 and 92, reproducibility of vibration acceleration with respect to input signals can be improved, so vibrations with subtle nuances can be implemented.

Both surfaces of the connecting bodies 91 and 92 in the first direction Z are connected to the movable body 6 and the support body 2 by adhesion or the like, respectively. Therefore, since the connecting bodies 91 and 92 reliably follow the movement of the movable body 6, resonance of the movable body 6 can be effectively inhibited.

Further, the connecting bodies 91 and 92 are compressed in the first direction Z between the support body 2 and the movable body 6. Therefore, since the connecting bodies 91 and 92 reliably follow the movement of the movable body 6, resonance of the movable body 6 can be effectively inhibited.

(Configuration of Abutting Portion)

In the present embodiment, an abutting portion is provided that defines a movable range of the movable body 6 when the movable body 6 is moved in the second direction X and the third direction Y due to an impact from the outside. More specifically, in the movable body 6, the flat plate parts 811 and 821 of the first yoke 81 and the second yoke 82 face the inner surfaces 414s, 415s, 418s, and 419s of the side plate parts 414, 415, 418, and 419 in the second direction X. The inner surfaces 414s, 415s, 418s and 419s of the side plate parts 414, 415, 418, and 419 are a first abutting portion that comes into contacts with the movable body 6 and defines a movable range of the movable body 6 when the movable body 6 is moved in the second direction X due to external impact.

In the movable body 6, the pair of connecting portions 812 of the first yoke 81 and the pair of projecting portions 822 of the second yoke 82 are positioned between the side plate part 414 and the side plate part 418 which are separated in the third direction Y in the coil holder 4, and between the side plate part 415 and the side plate part 419 which are separated in the third direction Y. Accordingly, the end portions 414g and 418g facing each other in the side plate part 414 and the side plate part 418 and the end portions 415g and 419g facing each other in the side plate part 415 and the side plate part 419 are a second abutting portion that comes into contact with the movable body 6 and defines a movable range of the movable body 6 when moved in the third direction Y.

(Configuration of Power Supply Board 10)

Figure 7:
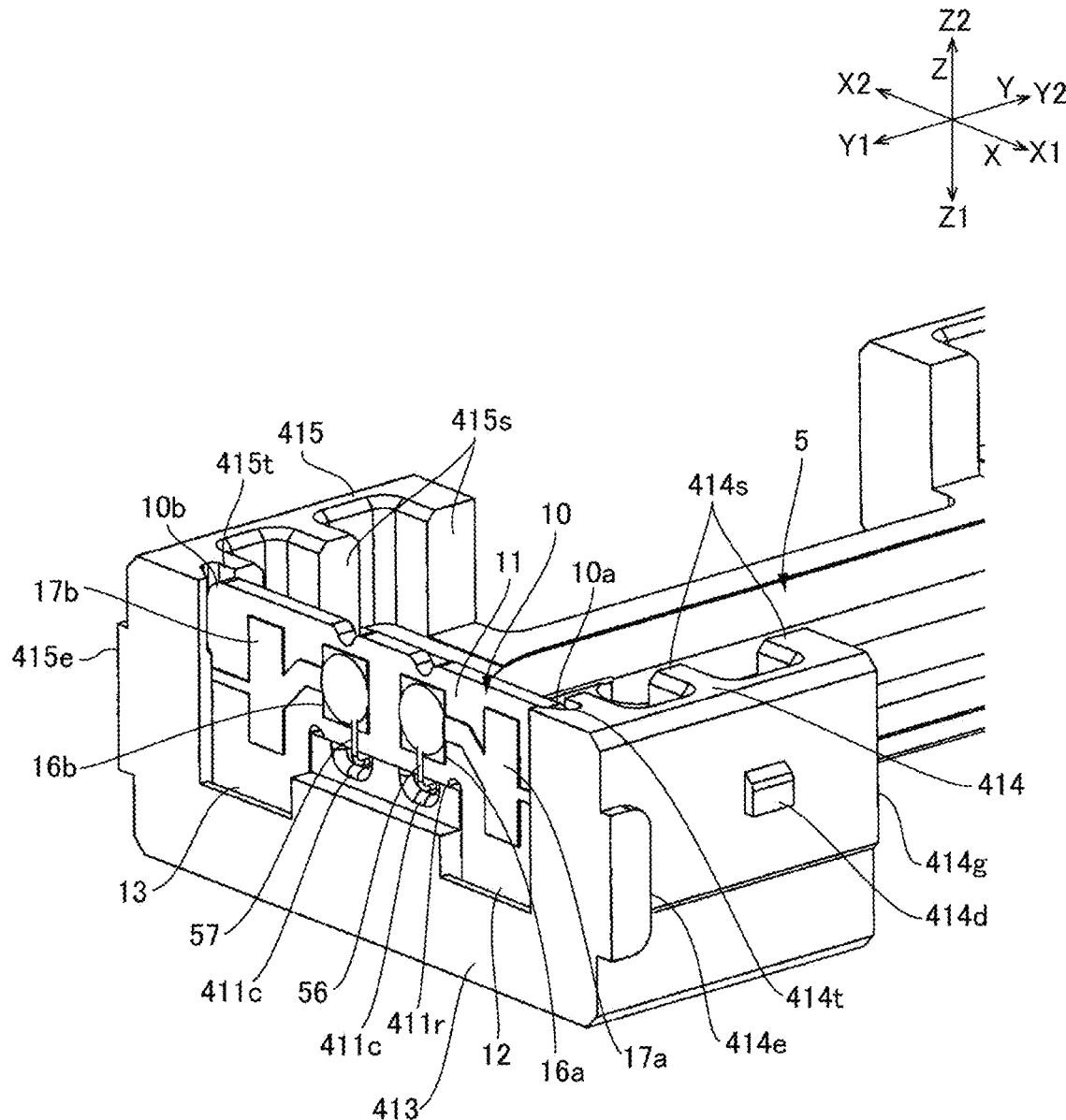
FIG. 7 is an explanatory diagram of a fixing structure of a power supply board in the actuator illustrated in FIG. 1.
Figure 8:
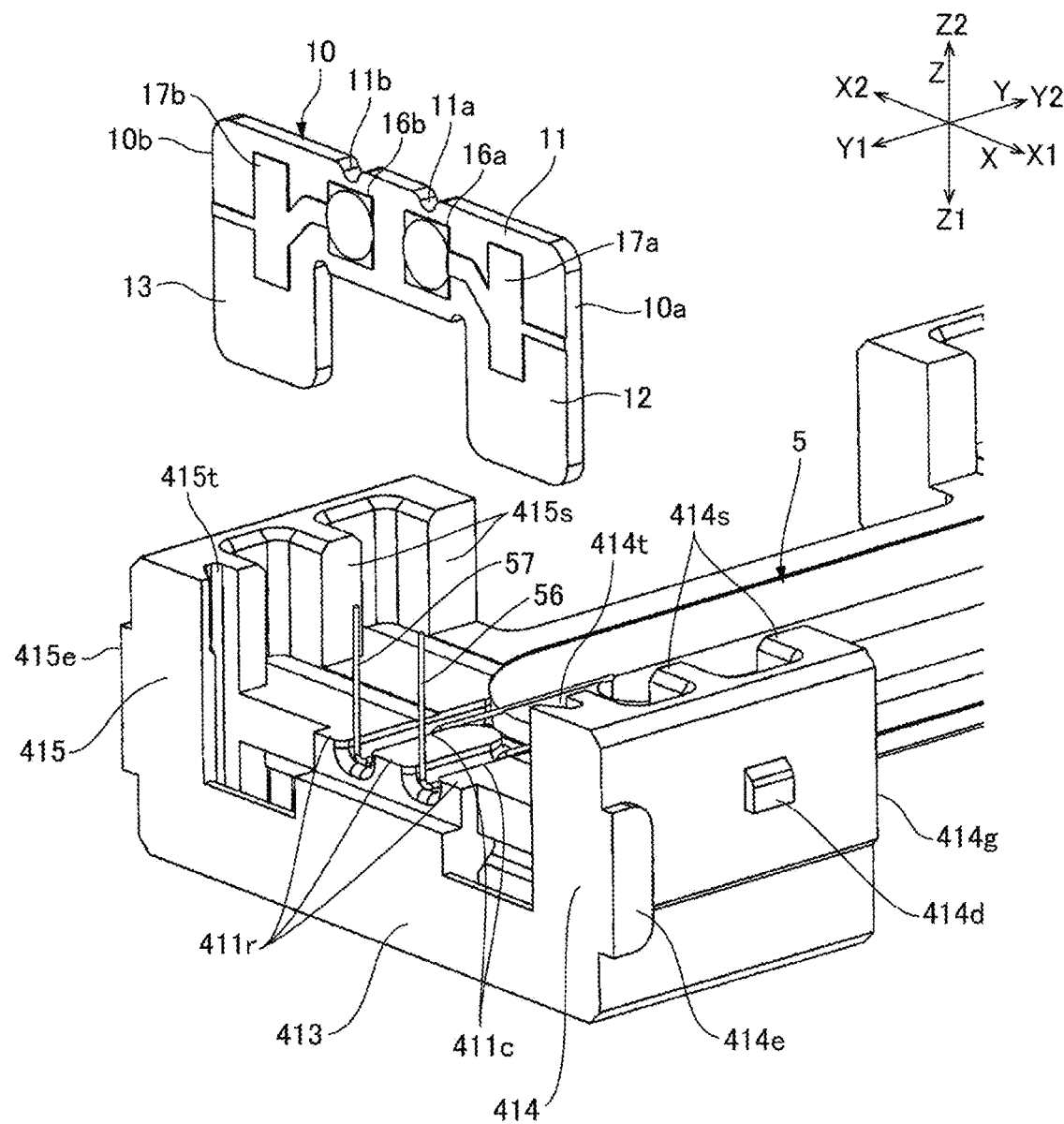
FIG. 8 is an explanatory diagram of slits that hold the power supply board illustrated in FIG. 7.

FIG. 7 is an explanatory diagram of a fixing structure of the power supply board 10 in the actuator 1 illustrated in FIG. 1. FIG. 8 is an explanatory diagram of slits 414t and 415t that hold the power supply board 10.

As illustrated in FIG. 1 and FIG. 3, in the actuator 1, the power supply board 10 is held in a position separated from the abutting portions described above (inner surfaces 414s, 415s, 418s, and 419s of the side plate parts 414, 415, 418, and 419 and the end portions 414g, 415g, 418g, and 419g) in the coil holder 4. Coil wires 56 and 57 forming the coil 5 are connected to the power supply board 10 by soldering, etc. In the present embodiment, the power supply board 10 is a rigid board.

In the present embodiment, in the coil holder 4, the power supply board 10 is held in an opening portion surrounded by the side plate parts 413, 414, and 415 on the first side in the third direction Y. In the present embodiment, the coil wires 56 and 57 are drawn out of the coil 5 on the first side Y1 in the third direction Y through two guide grooves 411c formed on a surface of the end portion 411 of the plate part 41 of the coil holder 4 on the second side Z2 in the first direction Z, extends from the first side Z1 to the second side Z2 in the first direction Z, and is connected to the power supply board 10.

In the present embodiment, in the coil holder 4, a pair of slits 414t and 415t extending to the first side Z1 in the first direction Z is formed in end portions 414h and 415h of the side plate parts 414 and 415 facing each other in the second direction X. Both end portions 10a and 10b of the power supply board 10 in the second direction X are fit inside the slits 414t and 415t, respectively. Therefore, the power supply board 10 is held by the coil holder 4 along side plate parts 413, 414, and 415 of the coil holder 4 at the position exposed from the case 3. In the present embodiment, after the end portions 10a and 10b of the power supply board 10 are fit into the slits 414t and 415t, the coil holder 4 and the power supply board 10 are fixed to each other with an adhesive to suppress vibration of the power supply board 10.

In the present embodiment, the power supply board 10 includes a first plate part 11 in which two lands 16a and 16b, to which the coil wires 56 and 57 are connected by soldering, are formed in positions separated in the second direction X, and two second plate parts 12 and 13 protruding from both ends of the first plate part 11 in the second direction X to the first side Z1 in the first direction Z. Two lands 17a and 17b are formed on both sides of the lands 16a and 16b in the first plate part 11, and a wiring member (not illustrated) from the outside is connected to the lands 17a and 17b.

At the end portion 411 of the coil holder 4, contact portions 411r are formed in positions passing through end portions of the guide grooves 411c on the first side Y1 in the third direction Y. The contact portions 411r receive an edge of the first plate part 11 of the power supply board 10 on the first side Z1 in the first direction Z. Both the end portions 10a and 10b of the power supply board 10 are fit into the slits 414t and 415t to a depth position in which the first plate part 11 of the power supply board 10 is in contact with the contact portion 411r. At an end of the first plate part 11 on the second side Z2 in the first direction Z, two recessed parts 11a and 11b that hold distal ends of the coil wires 56 and 57 when the coil wires 56 and 57 are to be connected to the power supply board 10 are formed.

Here, the widths of the slits 414t and 415t are decreased from the middle in the depth direction (first direction Z). Therefore, when the both end portions 10a and 10b are inserted in the slits 414t and 415t, the power supply board 10 is being held by the slits 414t and 415t even in the middle position until the first plate part 11 comes into contact with the contact portion 411r.

Here, the coil wires 56 and 57 are appropriately slackened from the coil 5 to the lands 16a and 16b (connecting position) of the power supply board 10. However, when the power supply board 10 is moved to a depth position from the contact portion 411r away to the second side Z2 in the first direction Z while the power supply board 10 being fit in the slits 414t and 415t, the coil wires 56 and 57 are made to tense.

As described above, in the present embodiment, since the power supply board 10 is held by the coil holder 4 covered with the case 3, an impact on dropping hardly propagates to the power supply board 10 through the case 3. Even when the impact on dropping propagates to the coil holder 4, since the power supply board 10 is moved together with the coil holder 4, the coil wires 56 and 57 are hardly pulled. Therefore, cut of the coil wires 56 and 57 by an impact on dropping hardly occurs, so drop impact resistance can be improved.

The power supply board 10 is provided along the side surface of the coil holder 4. Therefore, an impact on dropping is hardly applied to the power supply board 10 directly, so cut of the coil wires 56 and 57 due to an impact on dropping hardly occurs.

Further, in the coil holder 4, the power supply board 10 is provided at a position separated from the abutting portion with respect to the movable body 6 (inner surfaces 414s, 415s, 418s, and 419s of the side plate parts 414, 415, 418, and 419 (the first abutting portion), and end portions 414g, 415g, 418g, and 419g of the side plate parts 414, 415, 418, and 419 (the second abutting portion)). Therefore, even when the movable body 6 is moved due to an impact on dropping and the movable body 6 hits the abutting portion of the coil holder 4, the impact at that time hardly propagates to the power supply board 10. Thus, cut of the coil wires 56 and 57 due to an impact on dropping hardly occurs.

Further, the side surface of the coil holder 4 to which the power supply board 10 is fixed is located on the first side Y1 in the third direction Y. Here, the short side portion 52 (ineffective side) of the coil 5 is positioned in the third direction Y. In the coil 5, the coil wires 56 and 57 are drawn out of the short side portion 52 of the coil 5. Accordingly, if the power supply board 10 is disposed on the side surface of the coil holder 4 located on the first side Y1 in the third direction Y, a distance to which the coil wires 56 and 57 extend from the coil 5 to the power supply board 10 can be short.

The coil wires 56 and 57 extend from the first side Z1 to the second side Z2 in the first direction Z and are connected to the power supply board 10. Both end portions 10a and 10b of the power supply board 10 are fit, from the second side Z2 in the first direction Z, inside of the pair of slits 414t and 415t extending to the first side Z1 in the first direction Z in positions in which the slits 414t and 415t face each other of the coil holder 4. The power supply board 10 is fit into the slits 414t and 415t to a depth to come into contact with the contact portion 411r provided in the coil holder 4 from the second side Z2 in the first direction Z, and is positioned on the furthermost part of the first side Z1 in the first direction Z. Therefore, it is possible to easily provide appropriate slackness to the coil wires 56 and 57 extending from the first side Z1 to the second side Z2 in the first direction Z. Accordingly, when a temperature change occurs, even if the coil wires 56 and 57 are pulled due to a difference in thermal expansion coefficient between the coil wires 56 and 57 and peripheral members, etc., the coil wires 56 and 57 are hardly cut. Therefore, an operating temperature range of the actuator 1 can be expanded.

(Operation)

In the actuator 1 of the present embodiment, when power is supplied from outside (higher-level device) to the coil 5 via the power supply board 10, the magnetic driving circuit 1a including the coil 5, the first permanent magnet 71, and the second permanent magnet 72 makes the movable body 6 reciprocate in the second direction X. Therefore, the user who holds the actuator 1 in the hand can obtain information by vibration from the actuator 1. At that time, a frequency of a signal waveform applied to the coil 5 is changed depending on the information to be transmitted. Further, the polarity of the signal waveform applied to the coil 5 is reversed. At that time, a change in voltage between a period in which the polarity of the driving signal is negative and a period in which the polarity of the driving signal is positive is varied in speed. Thus, a difference arises between acceleration when the movable body 6 is moved to the first side X1 in the second direction X and acceleration when the movable body 6 is moved to the second side X2 in the second direction X. Therefore, it is possible to provide the user with an illusion that the actuator 1 is moved to the first side X1 or the second side X2 in the second direction X.

(Method for Manufacturing Actuator 1)

Figure 9:
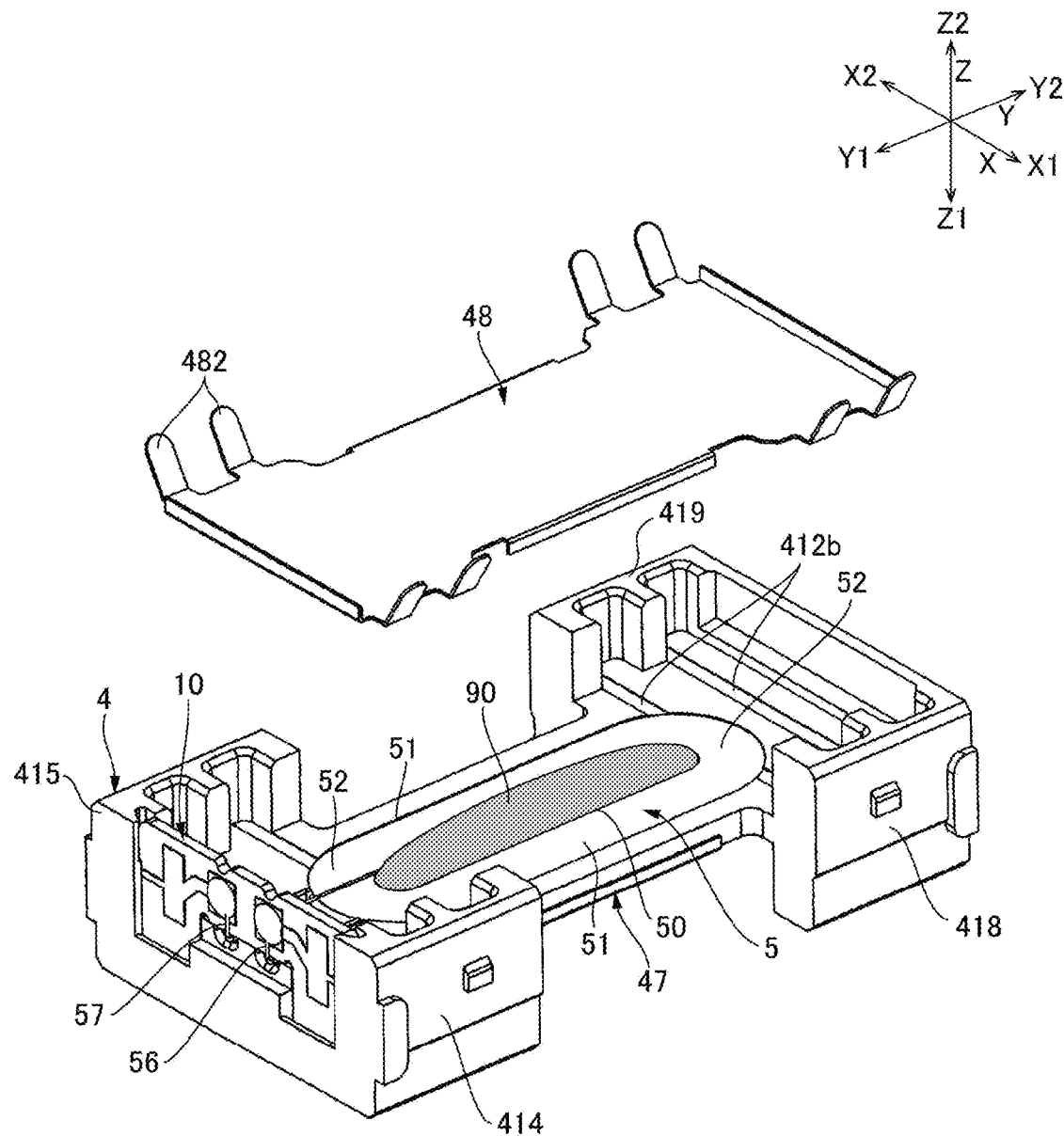
FIG. 9 is an explanatory diagram of a step of fixing a coil to a coil holder in a manufacturing process of the actuator illustrated in FIG. 1.
Figure 10:
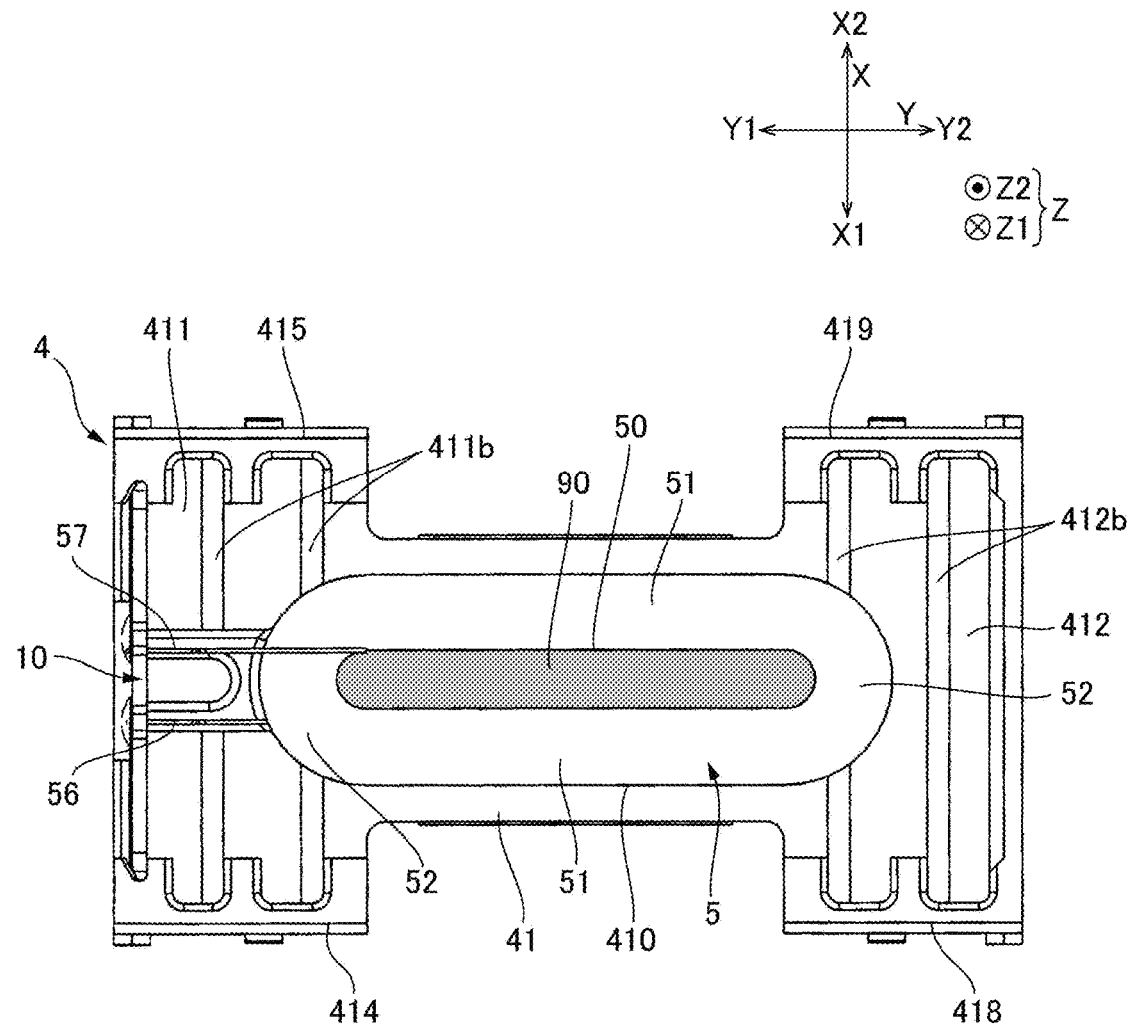
FIG. 10 is a plan view of a step of fixing the coil to the coil holder illustrated in FIG. 5.
Figure 11A:
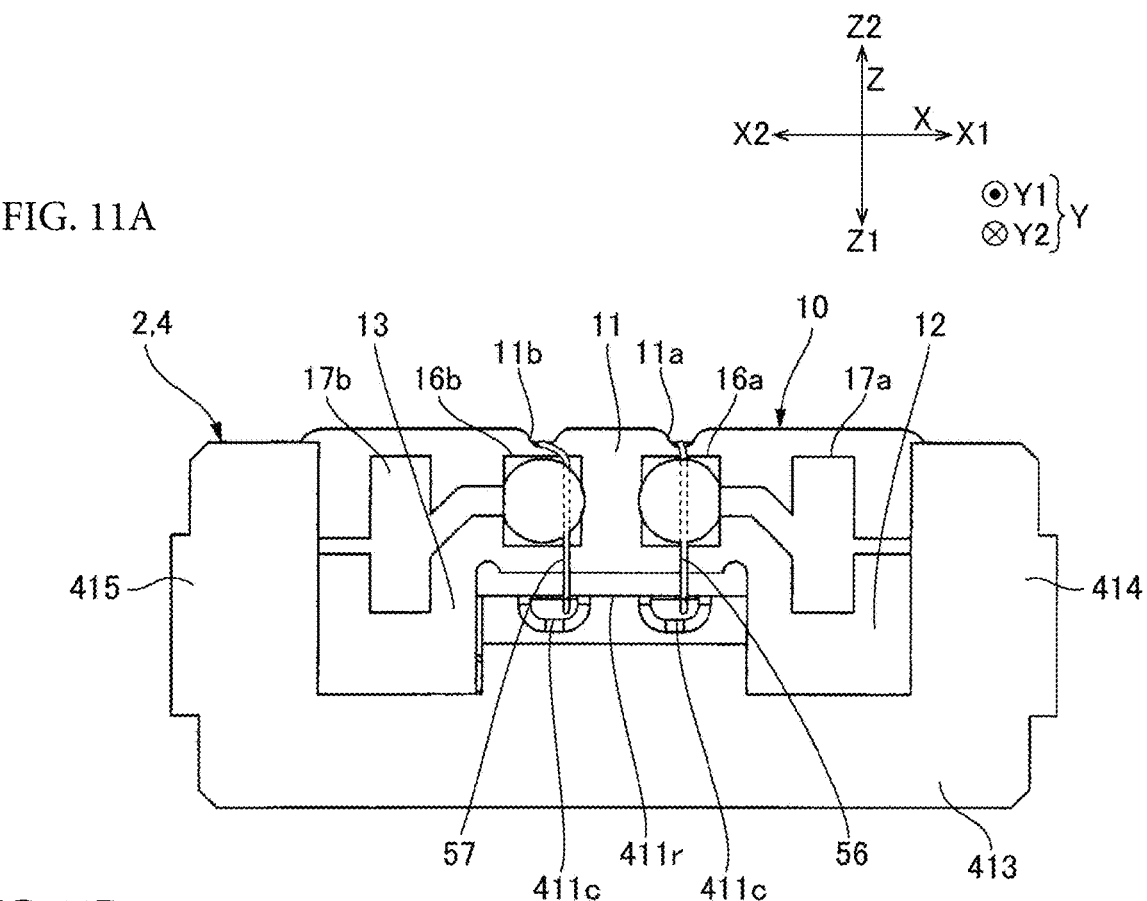
FIG. 11A and FIG. 11B are explanatory diagrams of a step of fixing the power supply board to the coil holder illustrated in FIG. 5.
Figure 11B:
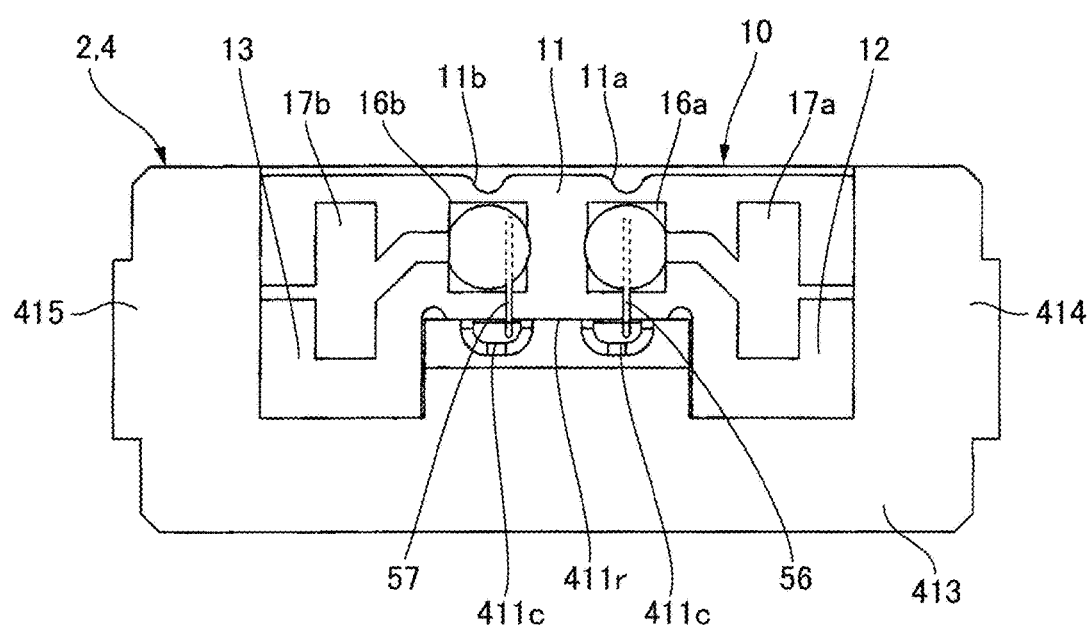

FIG. 9 is an explanatory diagram of a step of fixing the coil 5 to the coil holder 4 in a manufacturing process of the actuator 1 illustrated in FIG. 1. FIG. 10 is a plan view of a step of fixing the coil 5 to the coil holder 4 illustrated in FIG. 5. FIG. 11A and FIG. 11B are explanatory diagrams of a step of fixing the power supply board 10 to the coil holder 4 illustrated in FIG. 5.

In manufacturing the actuator 1, first, as illustrated in FIG. 9 and FIG. 10, the first plate 47 is disposed so as to overlap the coil placement hole 410 and the plate part 41 of the coil holder 4 from the first side Z1 in the first direction Z. At that time, the first protruding portion 472 is inserted to engage the first holding portions 414a, 415a, 418a, and 419a of the side plate parts 414, 415, 418, and 419. Therefore, the first plate 47 is held by the coil holder 4 while closing the coil placement hole 410 from the first side Z1 in the first direction Z. Next, as illustrated in FIG. 9 and FIG. 10, the coil 5 is placed in the coil placement hole 410.

In this state, as illustrated in FIG. 7, the power supply board 10 is fixed to the coil 5. In the present embodiment, as illustrated in FIG. 11A, the end portions 10a and 10b of the power supply board 10 are fit into the slits 414t and 415t of the coil holder 4 from the second side Z2 in the first direction Z. At that time, insertion of the power supply board 10 is stopped in a position halfway before the power supply board 10 comes into contact with the contact portion 411r of the coil holder 4 from the second side Z2 in the first direction Z. Therefore, the power supply board 10 is separated apart from the contact portion 411r.

In this state, the coil wires 56 and 57 are drawn from the first side Z1 in the first direction Z to the second side Z2, and connected to the lands 16a and 16b of the power supply board 10 by soldering. At that time, the coil wires 56 and 57 are made to pass through the recessed parts 11a and 11b to position the coil wires 56 and 57. After connecting the coil wires 56 and 57 to the power supply board 10, excessive portions of the coil wires 56 and 57 on the distal end side are cut and removed.

Thereafter, the power supply board 10 is pressed into the slits 414t and 415t to a depth at which the power supply board 10 comes into contact with the contact portion 411r from the second side Z2 in the first direction Z. Thus, appropriate slackness is provided to the coil wires 56 and 57 between the coil 5 to the lands 16a and 16b (connecting position) of the power supply board 10. In the present embodiment, the power supply board 10 is pressed into the slits 414t and 415t to a depth at which the power supply board 10 comes into contact with the contact portion 411r from the second side Z2 in the first direction Z. Thereafter, the power supply board 10 is fixed to the coil holder 4 with an adhesive 90.

Here, since the widths of the slits 414t and 415t are decreased from the middle in the depth direction, when the power supply board 10 is inserted to the position in which the widths of the slits 414t and 415t are decreased, the power supply board 10 is temporarily fixed to the slits 414t and 415t. Therefore, when the power supply board 10 is pushed deeper into the slits 414t and 415t after connecting the coil wires 56 and 57 to the temporarily fixed power supply board 10, the coil wires 56 and 57 can be slackened. Further, by merely optimizing the position of the power supply board 10 when connecting the coil wires 56 and 57, it is possible to optimize the slackness to be provided to the coil wires 56 and 57.

Next, as illustrated in FIG. 9 and FIG. 10, after the air-core portion 50 of the coil 5 is filled with the adhesive, the second plate 48 is disposed so as to overlap the coil placement hole 410 and the plate part 41 of the coil holder 4 from the second side Z2 in the first direction Z. At that time, the second protruding portions 482 are inserted to engage the second holding portions 414b, 415b, 418b, and 419b of the side plate parts 414, 415, 418, and 419. Therefore, the second plate 48 is held by the coil holder 4 in a state in which the second plate 48 overlaps the coil 5 from the second side Z2 in the first direction Z. On the first side Z1 in the first direction Z with respect to the coil 5, the adhesive 90 flows between the coil 5 and the first plate 47, and flows into a gap between the first plate 47 and the plate part 41 of the coil holder 4. At that time, an excessive adhesive 90 flows into the recessed part 412a or the like formed on the surface of the end portions 411 and 412 of the plate part 41 on the first side Z1 in the first direction Z. On the second side Z2 in the first direction Z with respect to the coil 5, the adhesive 90 flows between the coil 5 and the second plate 48, and flows into a gap between the second plate 48 and the plate part 41 of the coil holder 4. At that time, an excessive adhesive 90 flows into the recessed parts 411b and 412b or the like formed on the surface of the end portions 411 and 412 of the plate part 41 on the second side Z2 in the first direction Z.

Therefore, when the adhesive 90 is cured, the coil 5 is fixed to the first plate 47 and the plate part 41 of the coil holder 4 by the adhesive layer 9 in which the adhesive 90 is cured. The first plate 47 is fixed to the plate part 41 of the coil holder 4 by the adhesive layer 9. The coil 5 is fixed to the first plate 47 by the adhesive layer 9, and the second plate 48 is fixed to the plate part 41 of the coil holder 4 by the adhesive layer 9.

Next, the connecting bodies 91 are made to adhere to two positions separated in the third direction Y on the surface of the first plate 47 on the first side Z1 in the first direction Z, and the connecting bodies 92 are made to adhere to two positions separated in the third direction Y on the surface of the second plate 48 on the second side Z2 in the first direction Z.

Next, the first yoke 81 to which the first permanent magnet 71 is fixed is disposed on the first side Z1 in the first direction Z with respect to the first plate 47, the second yoke 82 to which the second permanent magnet 72 is fixed is disposed on the second side Z2 in the first direction Z with respect to the second plate 48. End portions of the connecting portions 812 of the first yoke 81 are connected to the projecting portions 822 of the second yoke 82 by welding or the like. At that time, the connecting bodies 91 are made to adhere to the first yoke 81, and the connecting bodies 92 are made to adhere to the second yoke 82.

Next, after placing the first case member 31 so as to cover the coil holder 4 and the movable body 6 from the first side Z1 in the first direction Z, the second case member 32 is placed so as to cover the coil holder 4 and the movable body 6 from the second side Z2 in the first direction Z, and the engagement holes 321d formed in the side plate part 321 of the second case member 32 are made to engage the engagement protruding portions 414d, 418d, etc. of the coil holder 4. Thereafter, the first case member 31 and the second case member 32 are coupled by welding or the like to form the case 3.

Other Embodiments

In the embodiment described above, the permanent magnets (first permanent magnet 71 and second permanent magnet 72) are provided on both sides of the coil 5 in the first direction Z. However, at least an embodiment of the present invention is applicable also to an actuator in which a permanent magnet is disposed on one of the first and second sides in the first direction Z of the coils 5.

In the embodiment described above, the coil holder 4 and the coil 5 are provided in the support body 2, and the permanent magnets (the first permanent magnet 71 and the second permanent magnet 72) and the yokes (first yoke 81 and second yoke 82) are provided in the movable body 6. However, the configuration using the first plate 47 and the second plate 48 and the configuration for providing slackness in the power supply board 10 may be applied to an actuator in which the coil holder 4 and the coil 5 are provided in the movable body 6, and the permanent magnets (first permanent magnet 71 and second permanent magnet 72) and the yokes (first yoke 81 and second yoke 82) are provided in the support body 2.

In the embodiment described above, a gel member (viscoelastic member) is used as the connecting bodies 91 and 92, but rubber, a spring or the like may be used alternatively. Here, viscoelasticity is the property of materials that have both viscosity and elasticity. Many polymer materials, such as gel members, plastics, and rubber, have viscoelasticity. Accordingly, as the connecting bodies 91 and 92 having viscoelasticity, various rubber materials, such as natural rubber, diene rubber (e.g., styrene-butadiene rubber, isoprene rubber, butadiene rubber, chloroprene rubber, and acrylonitrile-butadiene rubber), non-diene rubber (e.g., butyl rubber, ethylene-propylene rubber, ethylene-propylene-diene rubber, urethane rubber, silicone rubber, and fluororubber), and thermoplastic elastomers, and modified materials thereof may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a movable body;
   a support body;
   a connecting body having at least one of elasticity and viscoelasticity, and disposed in contact with both the movable body and the support body in a position in which the movable body and the support body face each other; and
   a magnetic driving circuit comprising a coil provided in a first member that is one of the movable body and the support body, and a permanent magnet provided in a second member that is one of the movable body and the support body so as to face the coil in a first direction, the magnetic driving circuit causing the movable body to vibrate with respect to the support body in a second direction which intersects with the first direction, wherein
   the first member comprises a coil holder that holds the coil, a power supply board to which a coil wire forming the coil extending from a first side to a second side in the first direction is connected, and both end portions of the power supply board being fit, from a second side in the first direction, inside of a pair of slits extending to a first side in the first direction in positions in which the slits face each other of the coil holder,
   the power supply board is fit in the pair of slits to a depth in which the power supply board is in contact with a contact portion provided in the coil holder from the second side in the first direction, and
   the coil wire is slackened in a section between the coil and a connecting position with the power supply board.

2. The actuator according to claim 1, wherein the coil wire is made to tense in a depth position in which the power supply board is separated from the contact portion to the second side in the first direction while being fit in the pair of slits.

3. The actuator according to claim 2, wherein the power supply board is a rigid board.

4. The actuator according to claim 3, wherein the width of the pair of slits is narrower from the middle in the depth direction.

5. The actuator according to claim 4, wherein:
   the first member is the support body; and
   the second member is the movable body.

6. The actuator according to claim 3, wherein:
   the first member is the support body; and
   the second member is the movable body.

7. The actuator according to claim 2, wherein the width of the pair of slits is narrower from the middle in the depth direction.

8. The actuator according to claim 7, wherein:
   the first member is the support body; and
   the second member is the movable body.

9. The actuator according to claim 2, wherein:
   the first member is the support body; and
   the second member is the movable body.

10. The actuator according to claim 1, wherein the power supply board is a rigid board.

11. The actuator according to claim 10, wherein the width of the pair of slits is narrower from the middle in the depth direction.

12. The actuator according to claim 11, wherein:
    the first member is the support body; and
    the second member is the movable body.

13. The actuator according to claim 10, wherein:
    the first member is the support body; and
    the second member is the movable body.

14. The actuator according to claim 1, wherein the width of the pair of slits is narrower from the middle in the depth direction.

15. The actuator according to claim 14, wherein:
    the first member is the support body; and
    the second member is the movable body.

16. The actuator according to claim 1, wherein:
    the first member is the support body; and
    the second member is the movable body.

17. A method for manufacturing an actuator, which comprises:
    a movable body,
    a support body,
    a connecting body disposed so as to be in contact with both the movable body and the support body in a position in which the movable body and the support body face each other, and
    a magnetic driving circuit comprising a coil provided in a first member that is one of the movable body and the support body, and a permanent magnet provided in a second member that is one of the movable body and the support body so as to face the coil in a first direction, the magnetic driving circuit causing the movable body to vibrate with respect to the support body in a second direction which intersects with the first direction, the method comprising:
providing a pair of slits extending to a first side in the first direction in positions in which the slits face each other of the coil holder that holds the coil in the first member;
when both the end portions of the power supply board are fit inside the pair of slits from a second side in the first direction, in a middle position until the power supply board comes into contact with a contact portion provided in the coil holder from the second side in the first direction, drawing the coil wire forming the coil from the first side to the second side in the first direction and connecting the coil wire to the power supply board; and
then, pushing the power supply board into the pair of slits to a depth in which the power supply board comes into contact with the contact portion from the second side in the first direction.

* * * * *